C. A. BOWEN.
ELECTRIC TRAP.
APPLICATION FILED JAN. 24, 1912.
1,024,969.
Patented Apr. 30, 1912.
2 SHEETS—SHEET 1.
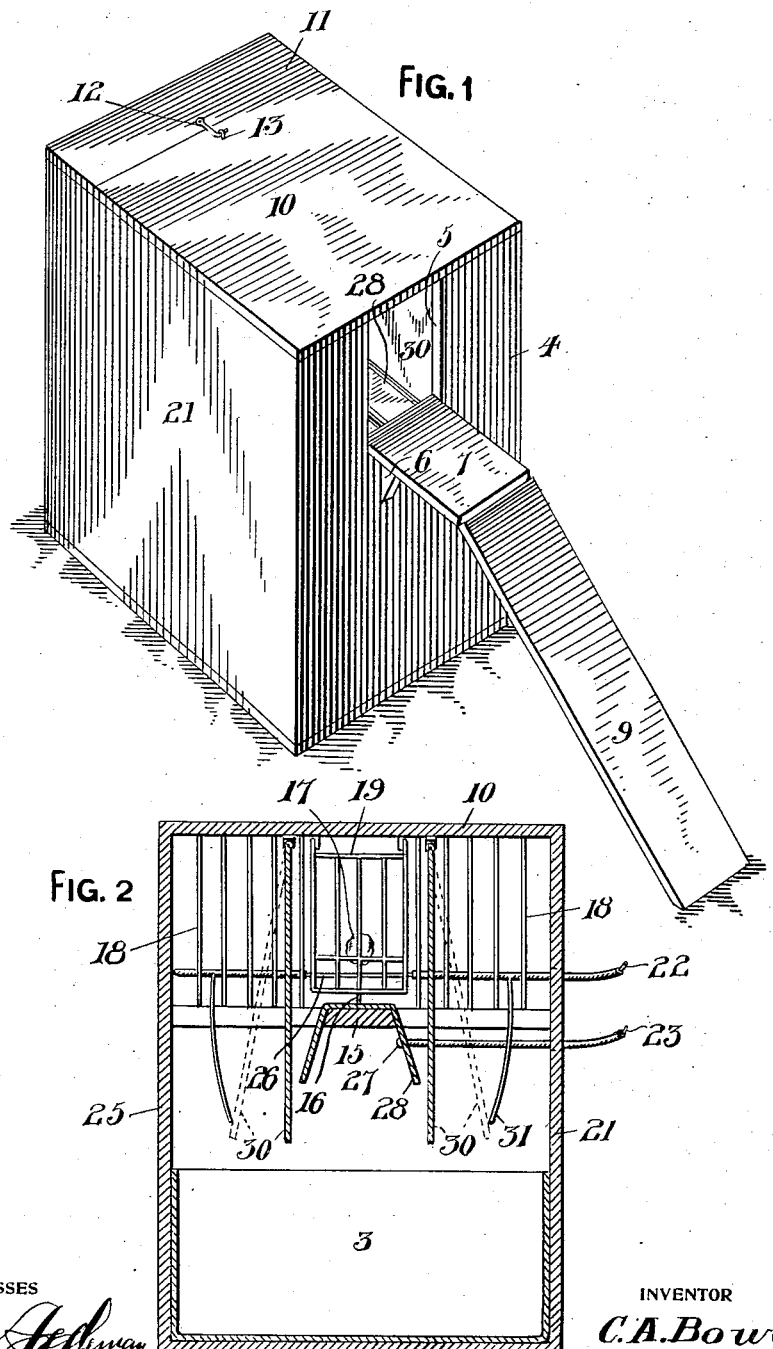

C. A. BOWEN.
ELECTRIC TRAP.
APPLICATION FILED JAN. 24, 1912.

1,024,969.

Patented Apr. 30, 1912.
2 SHEETS—SHEET 2.

WITNESSES

INVENTOR
C. A. Bowen
BY
ATTORNEYS

UNITED STATES PATENT OFFICE.

CHARLES A. BOWEN, OF RIVERVIEW, PENNSYLVANIA, ASSIGNOR OF ONE-HALF TO FRED BICKERTON, OF ELRAMA, PENNSYLVANIA.

ELECTRIC TRAP.

1,024,969.     Specification of Letters Patent.     Patented Apr. 30, 1912.

Application filed January 24, 1912. Serial No. 673,201.

*To all whom it may concern:*

Be it known that I, CHARLES A. BOWEN, a citizen of the United States of America, residing at Riverview, in the county of Washington and State of Pennsylvania, have invented certain new and useful Improvements in Electric Traps, of which the following is a specification, reference being had therein to the accompanying drawing.

This invention relates to electric rat traps, and my invention aims to furnish a trap with electrodes that are in a normally open circuit adapted to be closed by a rodent attempting to obtain a bait within the trap, the circuit being of sufficient voltage to electrocute a rodent.

The invention further aims to provide a trap that can be safely used without danger of other than rodents being shocked or electrocuted.

The invention still further aims to accomplish the above results by a combination of simple, durable and inexpensive elements that will be hereinafter specifically described and then claimed.

Reference will now be had to the drawings, wherein:—

Figure 3:
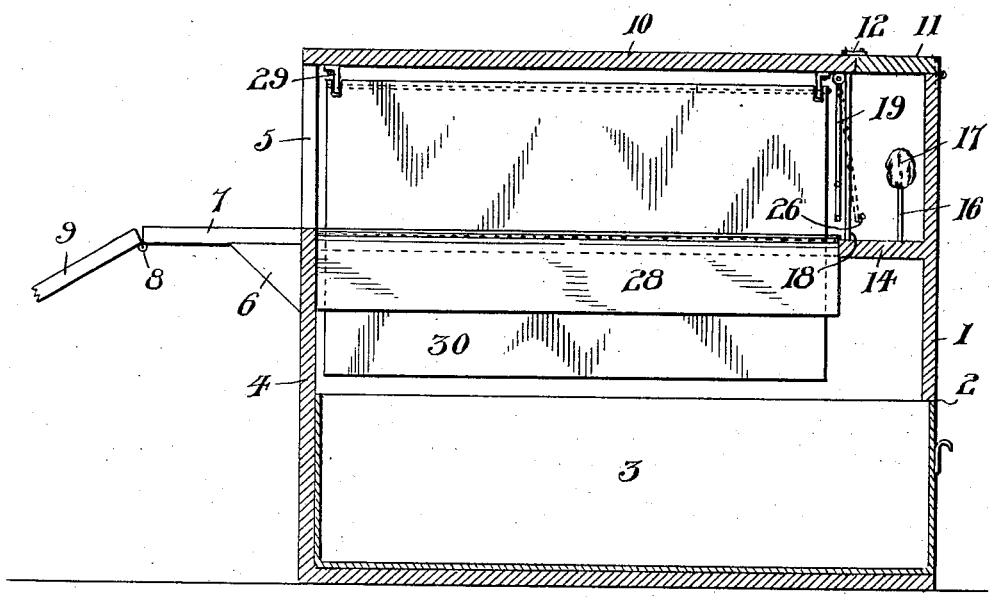
Figure 4:
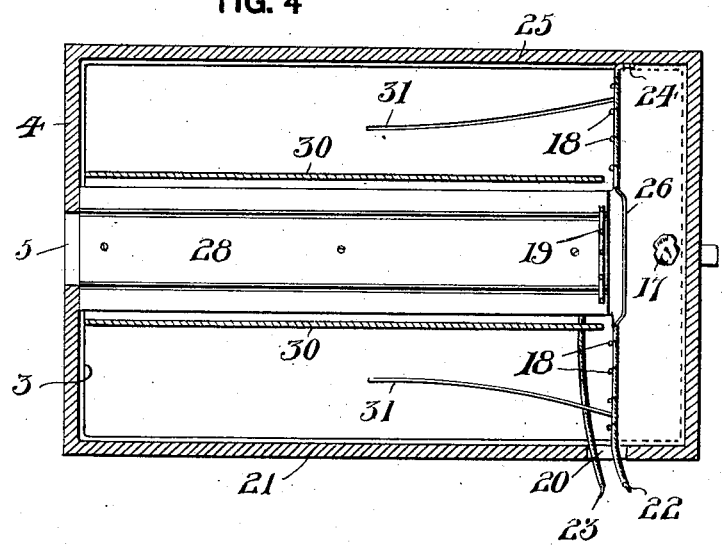

Figure 1 is a perspective view of the trap, Fig. 2 is a vertical cross sectional view of the same, Fig. 3 is a vertical longitudinal sectional view of the trap, and Fig. 4 is a horizontal sectional view of the same.

A trap in accordance with this invention comprises a box-like structure having the rear wall thereof provided with an opening 2 and a drawer 3 that fits within the opening. This drawer is adapted to receive rodents that have been electrocuted within the structure. The front wall 4 of the structure has the upper end thereof provided with an opening 5 and brackets 6, said brackets supporting platform 7 at the opening 5 and hinged to said platform, as at 8 is a gang plank 9 to facilitate a rodent in reaching the opening 5. The top 10 of the box-like structure has a hinged lid 11 retained normally in a closed position by a hook 12 and a staple 13.

Within the box-like structure and against the rear wall 1 is a transverse platform 14 and this platform is connected to the front wall 4 by a bar 15, said bar permitting of a rodent passing from the opening 5 to the platform 14. The platform 14 has a bait holder 16 provided with a suitable bait 17 that is placed upon the holder when the lid 11 is open. The front edge of the platform 14 is connected to the top plate 10 by vertical parallel bars 18 and directly in front of the bait 17 there is suspended a metallic gate 19 made of bars. Extending through an opening 20 in the side wall 21 of the box-like structure are insulated wires 22 and 23 that are connected to a suitable source of electrical energy, as a generator and the wire 22 extends across the box-like structure and is connected, as at 24 to the side wall 25 of said structure. That portion of the wire adjacent to the gate 19 is off-set and stripped of insulation, as at 26 to permit of the gate 19 making an electric contact with the wire. The wire 23 extends to the bar 15 and is connected, as at 27 to an inverted channel-shaped metallic contact plate 28 arranged upon the bar 15 with the walls of said contact plate inclined.

The top plate 10 of the box-like structure has sets of hangers 29 and suspended from said hangers are longitudinal metallic side plates 30 arranged in proximity to the bar 15. The metallic plates 30 are adapted to contact with branch wires 31 carried by the wire 22, the branch wires 31 being stripped of insulation and extending forwardly within the trap. Assuming that the wires 22 and 23 are connected with a source of electrical energy of sufficent voltage to electrocute a rodent, said wires are in a normally open circuit. A rodent upon the contact plate 28 attempting to obtain the bait 17 moves the gate 19 whereby said gate contacts with the off-set stripped portion 26 of the wire 22 and immediately completes a circuit that shocks the rodent. The rodent is precipitated against one of the side plates 30 and as the plate yields, said plate contacts with one of the branch wires 31 and the rodent's body is again subjected to a current that fully electrocutes the rodent if not previously electrocuted by the first shock. Even though a rodent should survive, the rodent after being precipitated in the drawer 3 cannot escape on account of the side plates 30 being suspended adjacent to the contact plate 28.

The box-like structure is made of wood and can be made upon a very large scale for use in connection with wharfs, warehouses and other buildings infested with rodents.

What I claim is:—

1. In an electric rat trap, the combination with a suitable source of electrical energy, of a box-like structure having the front wall thereof provided with an opening, a platform arranged within said structure at the rear wall thereof, a bait holder arranged upon said platform, a metallic gate suspended from the top of said structure in front of said bait holder, an insulated wire extending into said structure across said platform and in circuit with said source of electrical energy, said wire having a portion of the insulation thereof stripped whereby said gate can contact with said wire, a bar connected to said platform and the front wall of said structure adjacent to the opening thereof, and a metallic contact plate arranged upon said bar and connected to the opposite terminal of said source of electrical energy.

2. In an electric rat trap, the combination with a suitable source of electrical energy, of a box-like structure having the front wall thereof provided with an opening, a platform arranged within said structure at the rear wall thereof, a bait holder arranged upon said platform, a metallic gate suspended from the top of said structure in front of said bait holder, an insulated wire extending into said structure across said platform and in circuit with said source of electrical energy, said wire having a portion of the insulation thereof stripped whereby said gate can contact with said wire, a bar connected to said platform and the front wall of said structure adjacent to the opening thereof, a metallic contact plate arranged upon said bar and connected to the opposite terminal of said source of electrical energy, branch wires carried by said wire, and metallic side plates suspended within said structure adjacent to said contact plate and adapted to be swung by a rat's body to engage said branch wires and complete an electric circuit between said wires and said contact plate through the rat's body.

In testimony whereof I affix my signature in the presence of two witnesses.

CHARLES A. BOWEN.

Witnesses:
CHRISTINA T. HOOD,
MAX H. SROLOVITZ.

Copies of this patent may be obtained for five cents each, by addressing the "Commissioner of Patents, Washington, D. C."